(12) United States Patent
Dellecave, Jr. et al.

(10) Patent No.: US 8,904,042 B1
(45) Date of Patent: Dec. 2, 2014

(54) SYSTEM AND METHOD FOR SUBJECT MATTER NOTIFICATIONS

(75) Inventors: Thomas Louis Dellecave, Jr., Ashburn, VA (US); William Hollyer, Dulles, VA (US); Joel Pulliam, McLean, VA (US)

(73) Assignee: AOL Inc., Dulles, VA (US)

( * ) Notice: Subject to any disclaimer, the term of this patent is extended or adjusted under 35 U.S.C. 154(b) by 1121 days.

(21) Appl. No.: 10/747,254

(22) Filed: Dec. 30, 2003

(51) Int. Cl.
*G06F 15/16* (2006.01)

(52) U.S. Cl.
USPC ........... 709/246; 709/204; 709/224; 709/225; 705/1.1; 705/2; 707/613

(58) Field of Classification Search
CPC .............................. G06F 17/30873
USPC ......... 709/224, 225, 246; 705/1.1, 2; 707/613
See application file for complete search history.

(56) References Cited

U.S. PATENT DOCUMENTS

| | | | |
|---|---|---|---|
| 5,893,091 A * | 4/1999 | Hunt et al. | 707/3 |
| 5,978,828 A | 11/1999 | Greer et al. | |
| 6,029,175 A | 2/2000 | Chow et al. | |
| 6,029,195 A | 2/2000 | Herz | |
| 6,055,570 A | 4/2000 | Nielsen | |
| 6,654,786 B1 * | 11/2003 | Fox et al. | 709/203 |
| 6,735,615 B1 * | 5/2004 | Iwayama et al. | 709/204 |
| 6,963,850 B1 | 11/2005 | Bezos et al. | |
| 2002/0010760 A1 | 1/2002 | Armenta et al. | |
| 2003/0097376 A1 | 5/2003 | Ortega et al. | |
| 2004/0078464 A1 | 4/2004 | Rajan et al. | |
| 2004/0107197 A1 | 6/2004 | Shen et al. | |
| 2005/0108363 A1 | 5/2005 | Torigoe et al. | |
| 2005/0119910 A1 * | 6/2005 | Schneider | 705/1 |
| 2005/0119913 A1 * | 6/2005 | Hornreich et al. | 705/2 |
| 2005/0144266 A1 | 6/2005 | Antonelli et al. | |
| 2005/0261987 A1 | 11/2005 | Bezos et al. | |
| 2007/0174486 A1 * | 7/2007 | Holstege | 709/246 |

OTHER PUBLICATIONS

Office Action issued in U.S. Appl. No. 10/747,259 mailed Jan. 16, 2009, 19 pages.
Office Action, dated Apr. 6, 2010, for U.S. Appl. No. 10/747,259, filed Dec. 30, 2003 (16 pages).
Office Action, dated Aug. 1, 2008, for U.S. Appl. No. 10/747,259, filed Dec. 30, 2003 (17 pages).
Office Action, dated Aug. 22, 2007, for U.S. Appl. No. 10/747,259, filed Dec. 30, 2003 (18 pages).
Office Action, dated Jan. 23, 2008, for U.S. Appl. No. 10/747,259, filed Dec. 30, 2003 (22 pages).
U.S. Appl. No. 10/747,259, filed Dec. 30, 2003.
Advisory Action for U.S. Appl. No. 10/747,259, mailed Jun. 6, 2011 (3 pages).

(Continued)

*Primary Examiner* — Glenford Madamba
(74) *Attorney, Agent, or Firm* — Finnegan, Henderson, Farabow, Garrett & Dunner, LLP

(57) ABSTRACT

A host may be enabled to administer a notification system by receiving a notification instruction indicating a user has enrolled in the notification system, identifying metadata associated with the notification instruction, generating update criteria related to the notification instruction and the metadata, monitoring an online resource associated with the notification instruction, determining whether the online resource has been updated, using the update criteria to determine a predicted interest to the user, comparing the predicted interest to a threshold set with respect to the user, and generating a notification when the comparison indicates the user should receive the update.

49 Claims, 8 Drawing Sheets

(56) References Cited

OTHER PUBLICATIONS

Advisory Action for U.S. Appl. No. 10/747,259, mailed Jul. 6, 2011 (3 pages).
Final Office Action for U.S. Appl. No. 10/747,259, mailed Sep. 20, 2010 (13 pages).
Final Office Action for U.S. Appl. No. 10/747,259, mailed Feb. 18, 2011 (14 pages).
Final Office Action for U.S. Appl. No. 10/747,259, mailed May 16, 2013 (16 pages).
Office Action for U.S. Appl. No. 10/747,259, mailed Oct. 19, 2012 (13 pages).
Examiner's Answer for U.S. Appl. No. 10/747,259, mailed Jan. 2, 2014 (9 pages).
Notice of Panel Decision from Pre-Appeal Brief Review for U.S. Appl. No. 10/747,259, mailed Sep. 12, 2013 (2 pages).

* cited by examiner

200

Notification Enrollment

You asked to be notified when the web page cnn.com/electionreturns is updated.
Is this OK?

[YES] [NO]

The following subjects and sites may also be of interest:

CANDIDATE1   CANDIDATE2_WEBSITE
(CLICK FOR PREVIEW)

— 210

Would you like to be updated when new information is available regarding these subjects?

[YES] [NO]  FOR CANDIDATE1

[YES] [NO]  FOR CANDIDATE2_WEBSITE

[YES] [NO]  FOR BOTH CANDIDATE1 AND CANDIDATE2

— 220

Generally, how often would you like to be notified?
___ times per day

☐ infrequently
☐ once a day
☐ every update
☐ only if its hot!

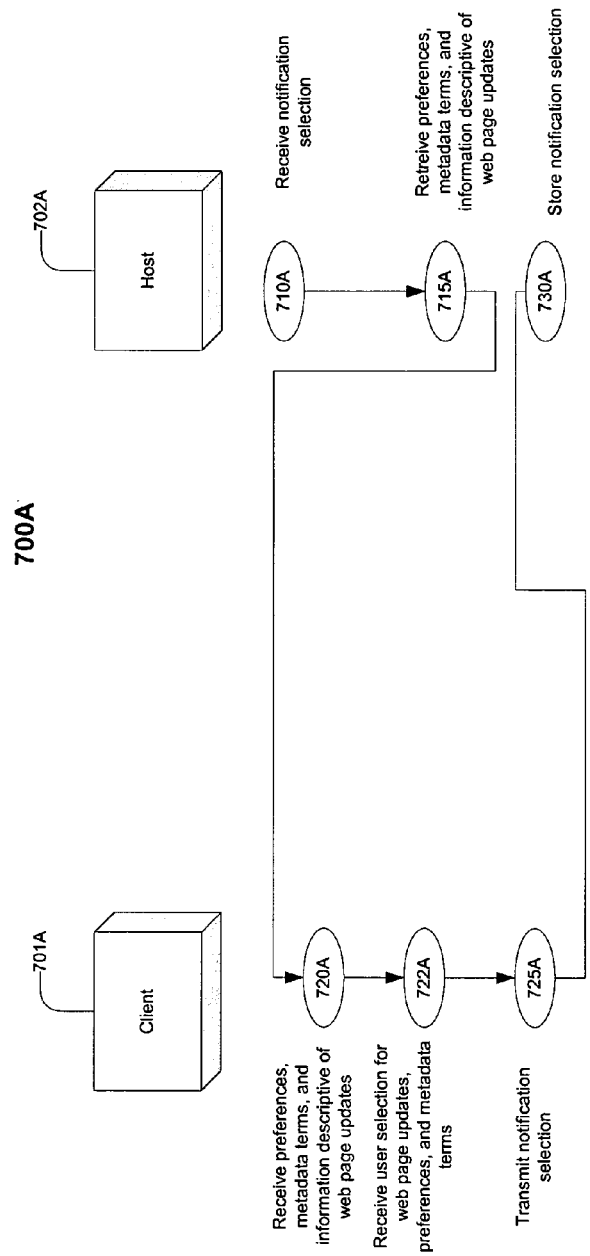

SYSTEM AND METHOD FOR SUBJECT MATTER NOTIFICATIONS

TECHNICAL FIELD

This document relates to notifications.

BACKGROUND

Communications networks, such as the Internet enable, provide access to vast amounts of information. Managing access to the information is an important and often difficult task.

SUMMARY

In one general sense, a host may be enabled to administer a notification system by receiving a notification instruction indicating a user has enrolled in the notification system, identifying metadata associated with the notification instruction, generating update criteria related to the notification instruction and the metadata, monitoring an online resource associated with the notification instruction, determining whether the online resource has been updated, using the update criteria to determine a predicted interest responsive to a predicted significance of an update or a predicted interest in the update, comparing the predicted interest to a threshold set with respect to the user, and generating a notification when the comparison indicates the user should receive the update.

Implementations may include one or more of the following features. Monitoring the online resource may include identifying web resources to be monitored based on at least the metadata. Determining the predicted interest may include comparing the update to the metadata. For example, determining the predicted interest may include comparing an older instance of the online resource to a newer instance of the online resource to identify a different portion, relating the update criteria to the different portion, and determining the predicted interest to indicate whether the different portion is responsive to the predicted significance or the predicted interest.

Monitoring the online resource, determining the predicted interest, comparing the predicted interest, and generating the notification may include monitoring multiple resources and determining if content from the online resource has been duplicated elsewhere in the multiple resources so that duplicate notifications are not generated.

Receiving the notification instruction, monitoring the online resource, generating the update criteria related to the notification instruction and the metadata, using the update criteria to determine the predicted interest, comparing the predicted interest, and generating the notification may include receiving the notification instruction requesting notifications for critical events, monitoring a community of users to determine popular resources, determining whether the popular online resources relate to the update criteria, and generating the notification for the popular resources related to the update criteria.

Determining the popular resources may include identifying an online resource with a high rate of access or experiencing a high degree of acceleration.

Using the update criteria to determine the predicted interest responsive to the predicted interest of the update may include determining whether generating the notification for the update violates a notification rule provided by the user. Determining whether providing the notification for the update violates the notification rule provided by the user may include determining whether generating the notification would violate a regulation set with respect to the frequency with which the user requests an update. The predicated significance may be determined to indicate whether a user preference for the frequency should be overridden, and if so, the notification may be generated. Key terms appearing in the online resource may be identified to identify other terms related to the key terms appearing in the online resource.

Receiving the notification instruction may include receiving the notification instruction from a client selecting a notification control in an information retrieval tool. Receiving the notification instruction may include receiving the notification instruction from a host that is proactively enrolling the user in the notification system without the express request to enroll from the user. Determining the predicted interest may include monitoring a user's access technique for accessing a network, and determining the predicted interest responsive to the access technique. Monitoring the user's access technique and determining the predicted interest responsive to the access technique may include determining that the user may receive instant messages, and determining the predicted interest responsive to an instant message capability.

Monitoring the user's access technique and determining the predicted interest responsive to the access technique may include determining that the user may receive electronic mail messages, and determining the predicted interest responsive to an electronic mail message capability.

Monitoring the user's access technique and determining the predicted interest responsive to the access technique may include determining that the user may receive Short Message Service (SMS) or Multimedia Message Service (MMS) messages, and determining the predicted interest responsive to the SMS or the MMS message capability.

Monitoring the user's access technique and determining the predicted interest responsive to the access technique may include determining that the user may receive voice communications, and determining the predicted interest responsive to the voice communications capability. Monitoring the user's access technique and determining the predicted interest responsive to the access technique may include determining a preference for receiving the notifications, and determining the predicted interest responsive to the preference when several forms of the access technique are available to use a preferred access technique.

Monitoring the online resource may include monitoring multiple web pages within a web domain. Monitoring multiple web pages within the web domain may include monitoring multiple pages that are associated with a top level domain name.

DESCRIPTION OF DRAWINGS

FIG. 2 is an exemplary GUI enabling a user to configure their notification.

FIG. 7A is a flow chart of an exemplary process by which the client may elect to receive notifications for subject matter in response to selecting a notification button.

DETAILED DESCRIPTION

Figure 1:
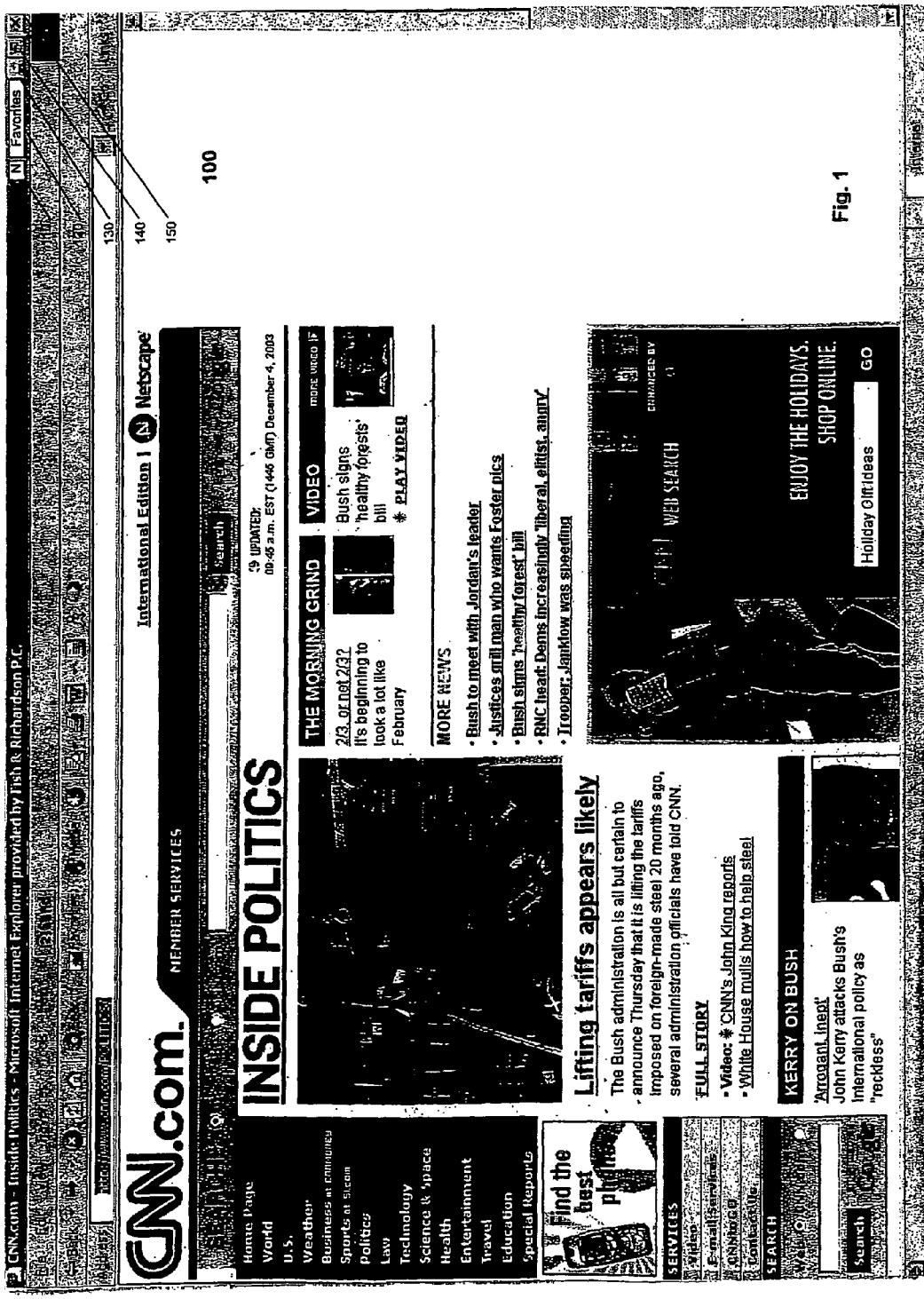
FIG. 1 illustrates an exemplary graphical user interface (GUI) enabling a client to enroll in a notification system.

Communications networks, such as the Internet, enable access to vast troves of information. One key to increasing the usefulness of these communications networks is putting information of interest before the appropriate user in a timely fashion while trying to avoid providing excessive information.

There are several challenges in achieving this degree of usefulness. For example, information of interest to one user may be irrelevant to a second user. Even where two users share an interest, the degree of interest may vary.

For example, a first user working as a campaign official in an election may be interested in receiving every piece of news and update related to the election while a second user who is following the election from a voter standpoint may only wish to receive a limited amount of information related to the election. If the second user receives too many updates, the second user may disenroll from the notification system. Thus, configured appropriately for this example, a successful notification system provides the first user with frequent updates and notifications while providing the second user with infrequent updates and notifications. Or, more optimally, a flexible notification system may allow a service provider and/or user to tailor the degree or significance of updates required before a notification is generated.

Furthermore, a user may be interested in updates related to subject matter in addition to receiving updates for a particular online resource. Thus, in the preceding example, the first user (the campaign official) may be interested in receiving notifications for news articles related to either or both of their candidate and a competing candidate, even if the news articles are not posted to a web page used to activate notifications. In addition or alternatively, if updates to a news article are appended to an existing news article, the first user may elect to receive notifications from these sources.

Finally, some articles may be posted across multiple online resources or sites. For example, a news article received from a wired service may be posted to multiple web sites. A media company may own multiple newspapers in several different cities. Each of the newspapers may post the same news article, or post the news article with minor variations (e.g., the banner ad may change). A user interested in the article from a first web site for a first newspaper may therefore not be interested in other or similar instances of the same or similar article posted to other web sites by other affiliated newspapers, and a preference to exclude notification of redundant or duplicate occurrences may be made available.

A notification system may be tailored to provide notifications when a web page is updated, and in some cases, provide notifications when an update exists that matches Boolean update criteria. While attempting to inspire notifications of updates to identified web resources, a user may find it valuable and convenient to receive an indication of related sites or topics, or of search criteria such as metadata, and also to inspire notifications based on such sites, topics, and criteria using a single or drill down interface. Such a capability may be used as an alternative or supplement to user-specification of their own search criteria, e.g., in a command line format. Furthermore, such a capability could be used to provide users with ideas of related topics or terms that things might otherwise not realize or incorporate into a search or notification request.

Thus, a host may receive a notification instruction that a user has enrolled in a notification system. The user may enroll in the notification system through an offering of a content provider in a web page, or through a notification tool associated with an information retrieval tool (e.g., a web browser). The host may identify metadata related to the notification instruction. For example, when the notification is generated from a political web page, other terms related to politics may be retrieved. Update criteria related to the metadata and the notification instruction may be generated. For example, the key terms appearing in a web page from which a notification instruction was generated and the related metadata terms may be used to generate a filtering rule that also supports the user preferences for notifications. An online resource may be monitored to determine when the online resource has been updated. The online resources that are monitored may be identified based on the metadata. For example, a web page or a series of web pages related to the update criteria may be monitored. When the online resource has been updated, the update criteria may be used to generate a predicted interest for the update that is responsive to a predicted significance or a predicted interest. For example, if 100 new words were added, they may be compared to the metadata. When the predicted interest indicates that the user should receive the update, a notification may be generated. For example, when the predicted interest reveals that the update is of significance or relates to a topic of interest to the user, a notification may be generated.

Thus, metadata may be used in at least two manners: (1) to identify web resources that should be monitored for updates, and (2) as a basis for comparison against the updated content within a monitored web resource while attempting to determine whether an update is worthy or appropriate for notification.

FIG. 1 illustrates one such notification tool that may be used to enroll an online resource such as a web page or a subject matter in a notification system. Specifically, FIG. 1 illustrates an exemplary graphical user interface 100 enabling a client to enroll a web page or subject matter into a notification system. GUI 100 includes a notification button 110, a favorites button 120, a minimize button 130, a maximize button 140, and a close application button 150. GUI 100 represents a web browser accessing a web page (cnn.com).

Generally, the user may select (e.g., click on) the notification button 110 to inspire receipt of notifications related to the content being accessed (in this case through a web browser). Specifically, selecting the notification button 110 enrolls an identity (e.g., a system, an account, a user profile, or a screen name) in a notification system so that the enrolled identity receives notifications of events, conditions, status changes, or news.

For example, GUI 100 features a news article related to an imminent presidential election. In one implementation, selecting the notification button 110 enrolls the user in a notification system that provides news updates to the news article. In another implementation, selecting the notification provides notifications when the web page (in this case cnn.com/politics) is updated. Alternatively, the user may receive notifications when the resource providing political news for cnn.com is updated (e.g., their political news has been moved from cnn.com/politics).

The favorites button 120 includes a button that adds the content or resource being accessed to a list of favorites maintained for an identity.

The minimize button 130 includes a control enabling minimization of the window or application being displayed. For example, in Windows-based systems, the minimize button 130 may cause the GUI 100 to shrink to a task bar.

The maximize button 140 includes a control enabling the window or application being displayed (e.g., GUI 100) to occupy or consume all or most of the display (e.g., Windows desktop).

The close application button 150 includes a control that terminates the application (e.g., GUI 100) being accessed.

FIG. 2 is an exemplary GUI 200 enabling a user to configure their notification. In one implementation, GUI 200 is presented after the user selects the notification button 110 in FIG. 1 so that the user may tailor their notifications, or simply confirm their desire to receive notification. GUI 200 includes a confirmation interface 210, a subject matter interface 220, and a frequency interface 230.

Generally, the confirmation interface 210 is a button, control, code segment, or interface enabling a user to confirm a notification selection. In the confirmation interface 210, the display reads, "You asked to be notified when the web page cnn.com/electionreturns is updated. Is this OK?" The confirmation interface 210 then includes a "YES" and "NO" button allowing a user to confirm their selection.

Subject matter interface 220 allows the user to adjust the scope of the subject matter to which notifications are provided. Subject matter interface 220 reads, "The following subjects and sites are also believed to be of interest:
CANDIDATE1 CANDIDATE2_WEBSITE
Would you like to be updated when new information related to these subjects is available?" The "CANDIDATE2_WEBSITE" may be linked or accompanied by a link (e.g., CLICK FOR PREVIEW) so that the user may preview or see an example of the form of notification that may be made available. In one example, a bubble window is presented over the pointing icon when the pointing icon interacts with the CANDIDATE2_WEBSITE that includes text or a sample screen shot from the CANDIDATE2_WEBSITE. In another example, a browser window is launched that presents a preview or an actual web site for CANDIDATE2_WEBSITE. The Subject Matter Interface 220 then includes a "YES" and "NO" button allowing a user to select whether or not to include the specified subject matter. Note that the Subject Matter Interface 220 includes options to allow a user to select notifications for each of the specified matters, in addition to presenting a button for both specified matters.

The frequency interface 230 allows a user to tailor the frequency and/or importance of notifications. Frequency interface 230 allows a user to 1) specify the number of times per day; 2) request to be notified infrequently; 3) request to be notified once per day; 4) request to receive every update; and 5) request to be notified "only if it's hot!"

While some of the controls are precise in terms of the degree of control (e.g., requesting to be notified once or a specified number of times per day), other controls feature a degree of subjectivity for a service provider to interpret. For example, the "only if it's hot" option may provide notification when an editor designates a news article of high importance. Alternatively, a content provider (e.g., the Cable News Network) or a service provider managing access to content sources may employ an automated scoring system to determine when a news update is important (e.g., merits "only if it's hot" notification). The score may relate to the degree of perceived subscriber interest (e.g., estimated or actual "hits" or click-throughs), or the presence of one or more key words (e.g., a metadata scoring system).

The degree of perceived subscriber interest may be modeled in a scoring system. For example, the number of times a URL (Uniform Resource Locator) is accessed may be tracked over time. When a URL is accessed a large number of times within a period of time (e.g., the rate of access to the URL), or the rate increases significantly within a period of time (e.g., the acceleration), a predicted interest based on the degree of interest of others that actually access the URL may be determined for the URL indicating the projected degree of interest for a user participating in a notification system.

The degree of interest may be tailored to reflect the degree of interest from those with similar demographics or interests. When the rate or acceleration values are tracked for users with similar interests, profiles, or demographics to a user participating in a notification system, and the rate/acceleration indicate that the URL is of interest to the demographic, the URL may be scored for the user and/or the demographic to indicate a projected high degree of interest in the particular URL.

Scoring the degree of interest for a demographic or profile may include using a small population or even a single user as a baseline for determining a predicted interest. For example, a particular user may be used as a representative sample for a demographic. When the particular user indicates that a URL is of interest, the value may be scored for all users.

The degree of interest may be modeled per category of news (e.g., sports, politics) or for a precise category of news (e.g., Chicago Cubs baseball or ski conditions in Colorado). The predicted interest may be modified to reflect a user's interest in the narrower subject matter versus the subject matter as a whole. For example, a predicted interest may be generated for news articles related to off-season personnel changes in Major League Baseball. For users interested in baseball, the articles may be scored so that only articles related to a blockbuster trade or a weekly summary are forwarded to users expressing an interest in baseball. However, if a community of users express an interest in a particular franchise (e.g., the Chicago Cubs), the predicted interest for articles related to off season personnel changes of the Chicago Cubs may be modified to reflect a greater interest in the particular subject matter, which may increase the likelihood of a notification being generated.

The degree of interest also may be scored by using a sample group of screening users that are sent a proposed notification in advance. The proposed notification may conclude with a form prompting the screening user to evaluate the proposed scoring of the article. For example, a proposed notification message related to breaking political news may conclude with a form that reads, "This notification is categorized as being 'Hot' for political aficionados, of likely interest to recipients in the AREA_DESCRIPTOR demographic (e.g., users in the Chicago area), and uninteresting to other users. Would you agree? Click YES or NO." The user then may indicate a concurrence with the evaluation, or provide a different evaluation (e.g., agree that the notification is Hot for political aficionados, but indicate that the article is uninteresting to all other users including recipients in the AREA_DESCRIPTOR (e.g., a Member of Congress's district). The scoring system then may evaluate the screening users' responses to evaluate whether the proposed scoring is accurate and/or whether the proposed notification may be sent. The proposed scoring then may be changed across one or more categories or demographics, which in turn may vary which users receive the notification.

Figure 3:
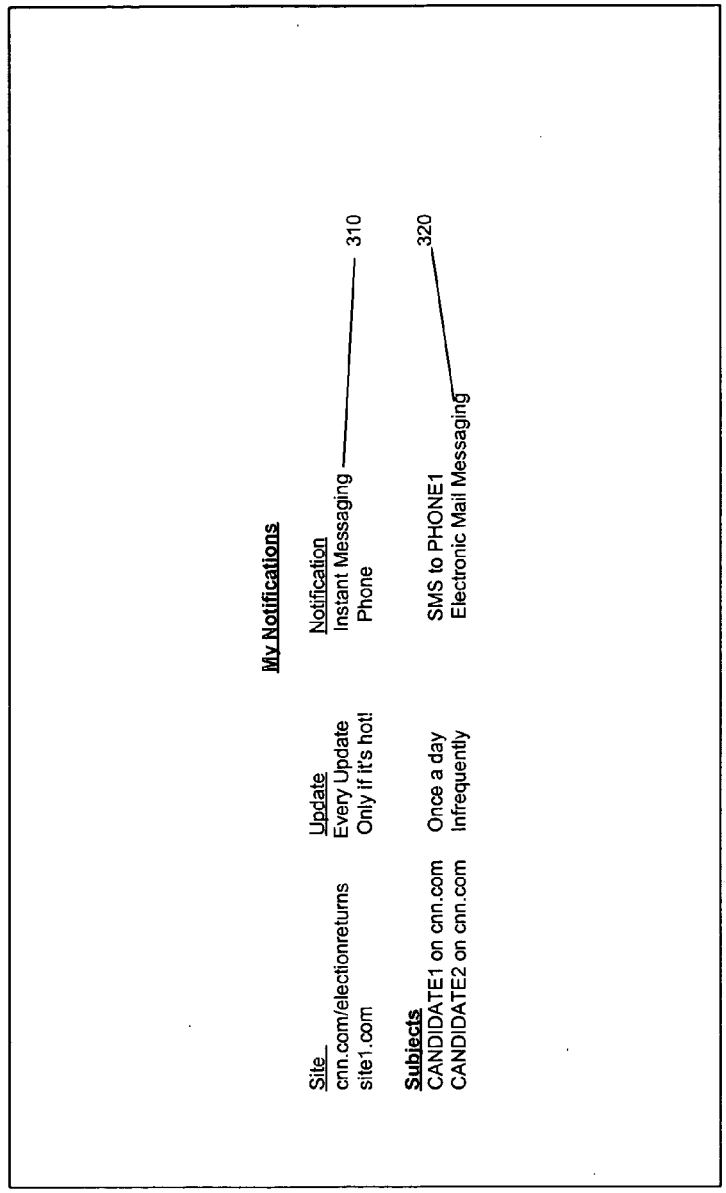
FIG. 3 is an exemplary GUI enabling a user to manage their notifications.

FIG. 3 is an exemplary GUI 300 enabling a user to manage their notifications. GUI 300 features a "My Notifications" interface 310, and a subject interface 320. GUI 300 is one example of how notifications may be organized in response to a user electing to receive notification (e.g., selecting the notification button 110 in FIG. 1).

The "My Notifications" interface 310 illustrates the online resources to which a user has requested updates. The "My Notifications" interface 310 indicates that the user is receiving notifications to cnn.com/electionreturns. The Update field describing the frequency or importance of the updates indicates that every update should be provided. The notification field indicates that instant messaging should be used to provide the notifications. The "My Notifications" interface 310 also lists a notification for an exemplary site (site1.com) that is provided by phone "only if it's hot." For example, a service provider may place a telephone call to a number for a user where an audio synthesizer transmits an audio signal representing the update from the exemplary site.

The subject interface 320 allows a user to manage subjects for which they receive updates. The subject interface 320 indicates that the user is subscribing to site updates for candidate1 on cnn.com. The updates for candidate1 should be provided at most once per day by SMS (Short Message Service) to the specified wireless phone number (Phone1). The updates for candidate2 appearing on cnn.com should be provided "infrequently" (a frequency that may be determined by a notification manager, a content manager, or a service provider) by electronic mail.

Alternatively, an alert infrastructure with cascading preferences may be consulted in delivering the update notifications or the update themselves. For example, an alerts infrastructure may instruct a notification system to generate an instant messaging alert if the user's instant messaging application is online. When the instant messaging alert is not online, but the client is active on a service provider's network, an electronic mail message may be generated. The alerts infrastructure may indicate that if the user is not online, an SMS and/or voice message may be transmitted over circuit-switched networks.

Various hybrids of alerts may be used. For example, when an alert is of critical importance, electronic mail messages and voice messages may be generated that describe the event. Similarly, the previously described alerts may be transmitted or performed across multiple online identities or with multiple accounts. For example, if a user is not available online (e.g., unable to receive instant messages or electronic mail messages), a voice message may be transmitted to a cell phone, a home phone, and a work phone. If the user does not respond to these voice messages so that the host can detect a human on the remote phone, or where the voice message is not acknowledged (e.g., by entering an access code or pressing a key on a touch tone pad), the notifications may be transmitted to another account. The other account may include a different screen name, or may be associated with different user altogether (e.g., a spouse or neighbor).

Figure 4:
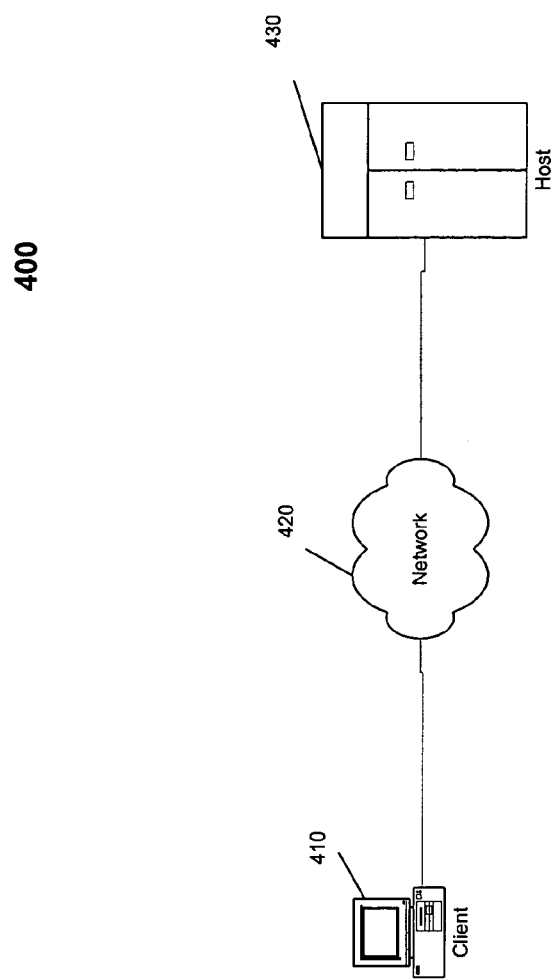
FIG. 4 is a block diagram of an exemplary communications system where a host is configured to generate notifications.

FIG. 4 is a block diagram of an exemplary communications system 400 where a host 430 is configured to generate notifications for a client 410. Generally, the client 410 displays one or more GUIs (e.g., the GUIs described previously in FIGS. 1-3) to enroll an identity in a notification system with the host 430.

Each of the client 410 and the host 430 may be implemented by, for example, a general-purpose computer capable of responding to and executing instructions in a defined manner, a personal computer, a special-purpose computer, a workstation, a server, a device, a component, other equipment or some combination thereof capable of responding to and executing instructions. The client 410 and host 430 may be configured to receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal that is capable of being delivered to the client 410 or the host 430.

The client 110 may include one or more devices capable of accessing content on the host 130. The host 110 may include a general-purpose computer (e.g., a personal computer (PC)) capable of responding to and executing instructions in a defined manner, a workstation, a notebook computer, a PDA ("Personal Digital Assistant"), a wireless phone, a component, other equipment, or some combination of these items that is capable of responding to and executing instructions.

In one implementation, the client 110 includes one or more information retrieval software applications (e.g., a browser, a mail application, an instant messaging client, an Internet service provider client, a media player, or an AOL TV or other integrated client) capable of receiving one or more data units. The information retrieval applications may run on a general-purpose operating system and a hardware platform that includes a general-purpose processor and specialized hardware for graphics, communications and/or other capabilities. In another implementation, the client 110 may include a wireless telephone running a micro-browser application on a reduced operating system with general purpose and specialized hardware capable of operating in mobile environments.

The client 110 may include one or more media applications. For example, the client 110 may include a software application that enables the client 110 to receive and display an audio or video data stream. The media applications may include controls that enable a user to configure the user's media environment. For example, if the media application is receiving an Internet radio station, the media application may include controls that enable the user to select an Internet radio station, for example, through the use of "preset" icons indicating the station genre (e.g., country) or a favorite. In another example, the controls may enable the user to rewind or fast-forward a received media stream. For example, if a user does not care for a track on a particular station, the user may interface with a "next track" control that will queue up another track (e.g., another song).

The network 420 includes hardware and/or software capable of enabling direct or indirect communications between the client 410 and the host 430. As such, the network 420 may include a direct link between the client 410 and the host 430, or it may include one or more networks or sub networks between them (not shown). Each network or sub network may include, for example, a wired or wireless data pathway capable of carrying and receiving data. Examples of the delivery network include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

The host 430 may include and/or form part of an information delivery network, such as, for example, the Internet, the World Wide Web, an online service provider, and/or any other analog or digital wired and/or wireless network that provides information. Such information delivery networks may support a variety of online services, including Internet and/or web access, e-mail, instant messaging, paging, chat, interest groups, audio and/or video streaming, and/or directory services.

In one implementation, the host 430 includes one or more information-providing software applications for accessing and transmitting requested files to the client 410. The information-providing applications may run on a general-purpose operating system and a hardware platform that includes a general-purpose processor and/or specialized hardware. Another implementation may include a reduced operating system with both general purpose and specialized hardware to operate in mobile environments.

Figure 5:
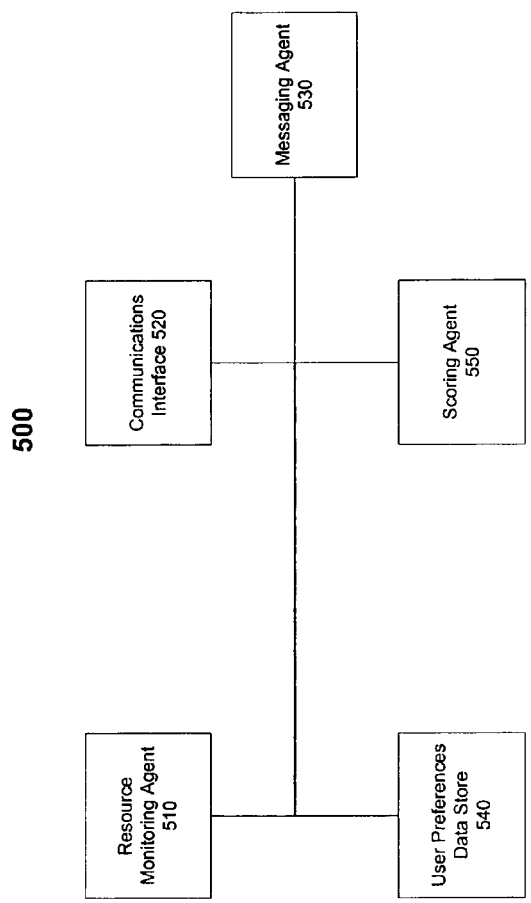
FIG. 5 is a block diagram of an exemplary host configured to manage notifications.

FIG. 5 is a block diagram of an exemplary host 500 configured to manage notifications. For convenience, particular components and messaging formats described earlier are referenced as performing the process. However, similar methodologies may be applied in other implementations where different components are used to define the structure of the system, or where the functionality is distributed differently among the components shown. Host 500 includes a resource monitoring agent 510, a communications interface 520, a messaging agent 530, a user preferences data store 540, and a scoring agent 550.

Generally, the resource monitoring agent 510 includes a code segment configured to monitor one or more resources providing content. For example, the resource monitoring agent 510 may be configured to monitor a web site, a news server, a streaming media device (providing audio/video) and/or a news feed.

In one example, a host 500 periodically retrieves a web page. The web page may be saved and/or compared with other instances of the web page to determine whether the web page has changed. When the web page has changed, the changes may be identified.

The host 500 may monitor the web page as specified by an administrator or a user. For example, the host 500 may be configured to poll a popular web page every minute. In contrast, a user requesting updates to an alumni web page that may only be updated once or twice a month may specify that the host should poll an alumni page once per day.

The host 500 may monitor the rate and/or acceleration values associated with a URL and when the rate or acceleration values indicate that a web page may have been updated as indicated by a different usage or traffic patterns; the web page may be retrieved to determine whether a web page has been updated.

When the online resource includes streaming content, the network utilization may be monitored to determine the degree of interest from an actual user community. When the network traffic has increased, the host may retrieve a directory or analyze the content being streamed to determine if new content is available. For example, a streaming media server may have posted a new video from a popular musician.

The resource monitoring agent 510 may include a list of resources that the resource monitoring agent 510 periodically references to determine if a resource has been updated. In one implementation, the resource monitoring agent 510 is configured to retrieve a current "snap shot" of content, compare the current snap shot to an older snap shot, and determine if the content has changed. In another implementation, the resource monitoring agent 510 subscribes to an event notification system operated by the resource being monitored. The resource being monitored may send messages to the resource monitoring agent 510 indicating that the resource has been updated.

Generally, the communications interface 520 enables the host 500 to exchange information with other devices in a communications system (e.g., a client or a resource being monitored). In one implementation, the communications interface includes a network interface card and network protocol software configured to access a network (e.g., network 420) to access content being updated and also to provide notifications to clients. In another implementation, the communications interface 520 is used to receive user requests for notifications.

The messaging agent 530 includes a code segment configured to provide notifications through a messaging application. The messaging application 530 may include electronic mail messaging software configured to provide notifications via electronic mail messages. Other messaging formats that may be used by the messaging agent 530 include, but are not limited to, instant messaging, "pop up" messaging, and/or telecommunications messaging (e.g., SMS, MMS, voice mail messaging). Other messaging formats may include audio and video formats that are rendered upon receipt by a user.

The user preferences data store 540 includes one or more user preferences so that the notifications conform to user preferences and expectations. In one implementation, the user preferences data store 540 uses a default profile absent instructions to the contrary. Thus, a user requesting notification may receive the notifications conforming to a default profile specified by the host 500. However, if a user indicates their preference for receiving notifications (e.g., using the GUIs 200 and 300), the preferences may be used in place of the default profile.

Examples of the parameters used to describe the user preferences include a frequency, priority, subject matter, or resource(s) of interest (e.g., cnn.com or cnn.com/politics). A user need not specify the parameters; rather a content provider or service provider may infer parameters. If the user's selections for notifications indicate a strong association with a broad subject matter (e.g., politics in general), the parameters may indicate other subjects within politics likely to be of interest. Thus, while a user may not have expressed interest in a particular election, the host 500 may provide notification of events related to the particular election when the particular election has profound consequences (e.g., determines which party controls a legislature).

The user preferences data store 540 also may be used to track a history of notifications. For example, if a user has requested to receive no more than one notification per day, the user preferences data store 540 may indicate whether a particular user identity has received an update.

The scoring agent 550 includes a code segment that determines whether an update is significant. In one implementation, the scoring agent 550 determines the significance of the changes. For example, when two sentences in a news article or a banner advertisement are the only portions of a web page has changed, the predicted interest for the update would likely indicate that most users should not receive the update. However, if a term of interest appears repeatedly in the updated portion of the web page (e.g., in the portion that did not appear previously), the update may receive a higher predicted interest to increase the likelihood that users receive notification of the update.

The scoring agent 550 and/or the user preferences data store 540 may work together to preclude duplicate updates from being provided. For example, a news provider may syndicate a news article across multiple resources with little or insubstantial changes between the multiple resources. Thus, before providing a notification, the host 500 may determine if the update has already been provided. This may be performed by comparing a proposed notification with a history of notifications provided for a user. Alternatively, a notification may be compared against other notifications provided to a user community to avoid the need to perform the comparison on an individual basis.

The scoring agent 550 may interface with a counting system configured to determine which users and/or how many users have accessed an online resource, or a particular file, item, or web page within the online resource. For example, the resource monitoring agent 510 may use a communications interface 520 to communicate with a management code segment residing on a web server that administers a counting system. The resource monitoring agent 510 may provide the information from the counting system to the scoring system 550, which processes the data to indicate a notification should be generated.

A resource monitoring agent 510 may receive the rate and acceleration values for different pages on a server or collection of servers (e.g., cnn.com). The resource monitoring agent may periodically provide the rate and acceleration information to the scoring agent 550. The scoring agent 550 then may process the rate and acceleration information to generate a predicted interest indicating the relative importance or priority of a web page. An online resource (e.g., a web page) with a high rate or experiencing a high degree of acceleration may be scored to increase the likelihood of a notification being generated.

The scoring agent 510 may work in conjunction with the user preferences data store. For example, the user preferences data store may reveal that a particular user has only requested notifications of critical importance (e.g., "only if it's hot"). Accordingly, the predicted interest (or the threshold against which the predicted interest is compared) may be configured so that only notifications believed to be of critical importance are generated. A notification may be identified as being of critical importance based on a comparison of a present rate/acceleration with historical rates and accelerations (which may be modified to account for long term trends and network interruptions that may drive up the hit count on a particular device). A service provider may track usage information relating to the most significant events. For example, a predicted interest and usage information related to the high volumes of traffic that occurred with the terrorist attacks on Sep. 11, 2001 may be stored and used as a comparison value to determine whether subsequent events as indicated by subsequent usage patterns are indicative of events of the significance of the terrorist attacks.

Figure 6:
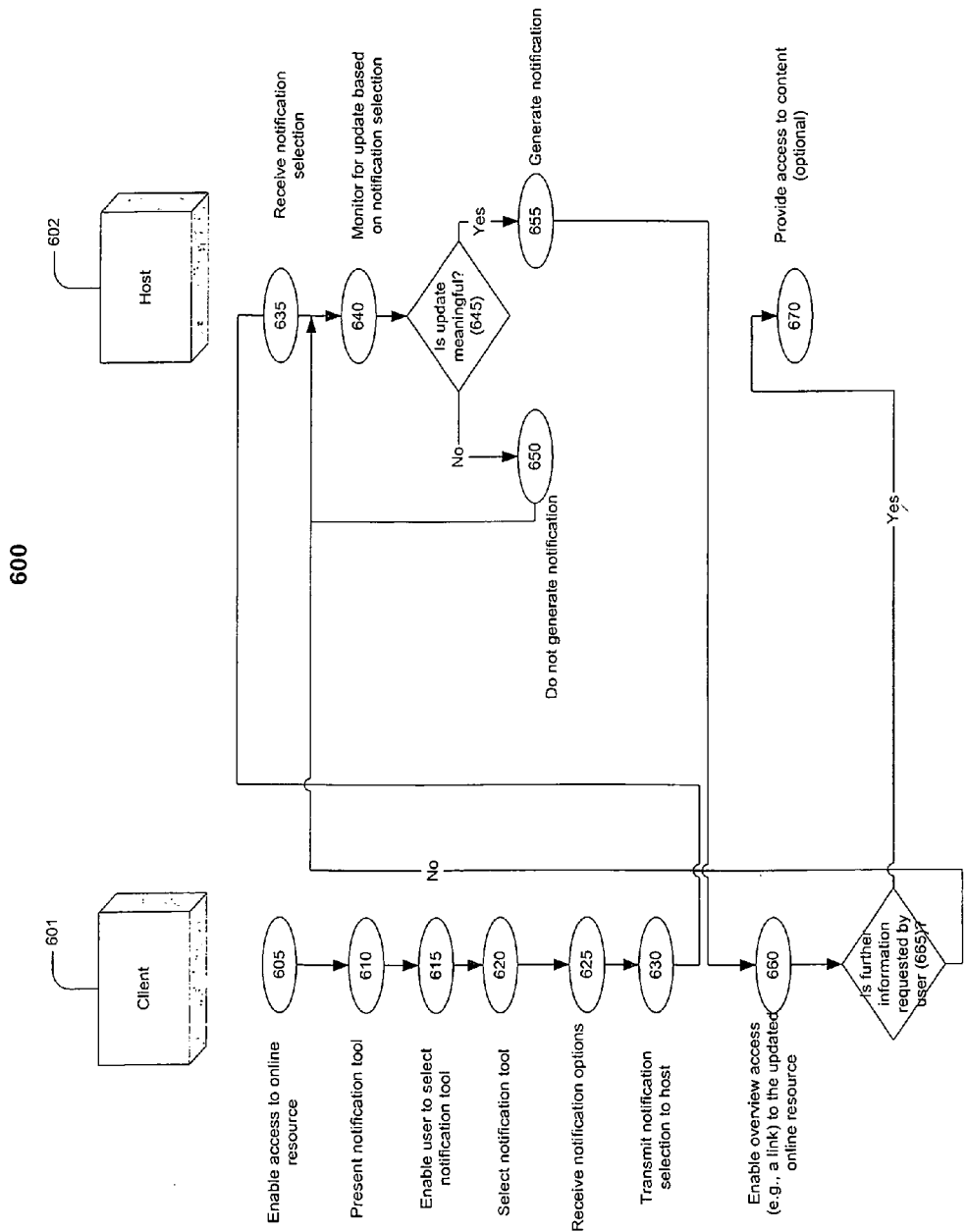
FIG. 6 is a flow chart of an exemplary process by which a client may enroll in and receive notifications.

FIG. 6 is a flow chart 600 of an exemplary process by which a client may enroll in and receive notifications. For convenience, particular components and messaging formats described earlier are referenced as performing the process. However, similar methodologies may be applied in other implementations where different components are used to define the structure of the system, or where the functionality is distributed differently among the components shown.

Initially, the client 601 enables access to an online resource (605). For example, the client 601 may use a web browser to access a news web site. The client 601 presents the notification tool (610). For example, the client 601 may present a web browser with a notification button (e.g., see 110 of FIG. 1) configured to enable enrollment of the user in a notification system for any web site to which the browser navigates, whether or not the web site itself enables such notifications and without requiring additional navigation by the user. However, as an alternative, a notification control physically, logically or visually external to the web browser but resident on the client may be used to enroll a user in a notification system. For example, client access software (e.g., an integrated online service provider environment such as the America Online client software) may include a button in a task bar that enables access to and configuration of a notification related to online content being accessed through the client access software. In another implementation, the host may monitor how a client accesses one or more online resources and provides the notification without receiving an enrollment selection from the user. Rather, by monitoring the client, the host may proactively enroll the client in the notification system.

The client 601 enables the user to select the notification tool (615), which is then selected (620). The user may be made able to select the notification tool in several different manners. In one implementation, the user selects the notification tool by selecting a notification button associated with a browser similar to GUI 100 in FIG. 1. In another implementation, a user receives a prompt similar to GUI 200, whereby the notification may be better tailored to a user's interest (e.g., see 220 of FIG. 2). The prompt may offer related web sites or identify additional subject matter of interest to the user for which the user may elect to receive notifications. The related subject matter may be identified by an information retrieval tool (e.g., a browser), a host, a web server operator and/or a client.

An information retrieval tool may identify the related subject matter by parsing the online resource being accessed, and relating the parsed online resource to an index of metadata. When one or more parsed terms in the parsed online document appear in the index of metadata, one or more terms that are included in the index of metadata and related to the parsed terms may be identified and incorporated into a prompt presented to the user. The index of metadata may reside in the information retrieval tool, in the client, or on a host. Alternatively, a summary of the underlying key terms and metadata may be presented. The operations that relate the parsed terms to the index of metadata also may be performed on a host in addition to being performed on a client. There may be a client specific index of metadata associated with a user profile or a client device in addition to a multiuser or global index of metadata. For example, a user may request notifications for changes to a particular web site. The client 601 receives and displays notification options (625). The client 601 selects the notification options (e.g., frequency, priority, subject matter of interest, format of notification (instant messaging, electronic mail)) and transmits the notification selection to the host (630) (see e.g., 230 of FIG. 2).

The host 602 receives the notification selection and enrolls the client (or identity associated with the client) in the notification system (635). At some later point, the host 602 monitors for an update based on the notification selection (640). The host 603 determines if the update is meaningful (645). In one example, determining if the notification is meaningful includes determining if the differences between the last notification (or differences between the last access to the resource) and the present site or update are significant (e.g., as determined by a scoring agent). In another example, determining if the notification is meaningful includes determining the significance of the changes since the last update was received.

If not deemed meaningful, the host 602 does not generate the notification (650), returning to again monitor for an update (640). If the update is meaningful, the host 602 generates the notification message (655).

The client 601 receives the notification and enables overview (e.g., a summary or link) access to the updated online resource (660). In one example, receiving the notification includes receiving an instant message with a synopsis or capsule of the updates. The notification or instant message may include a link so that a full article in a web page may be retrieved and displayed. In any event, notification is presented, either through the notification message itself, or through selecting a link or reference appearing in the notification. The client 601 determines if further information is requested by the user (665). If so, the host 602 then may optionally provide content (670). If not, the host 602 may return to monitoring for updates based on the notification selection (640).

Figure 7:
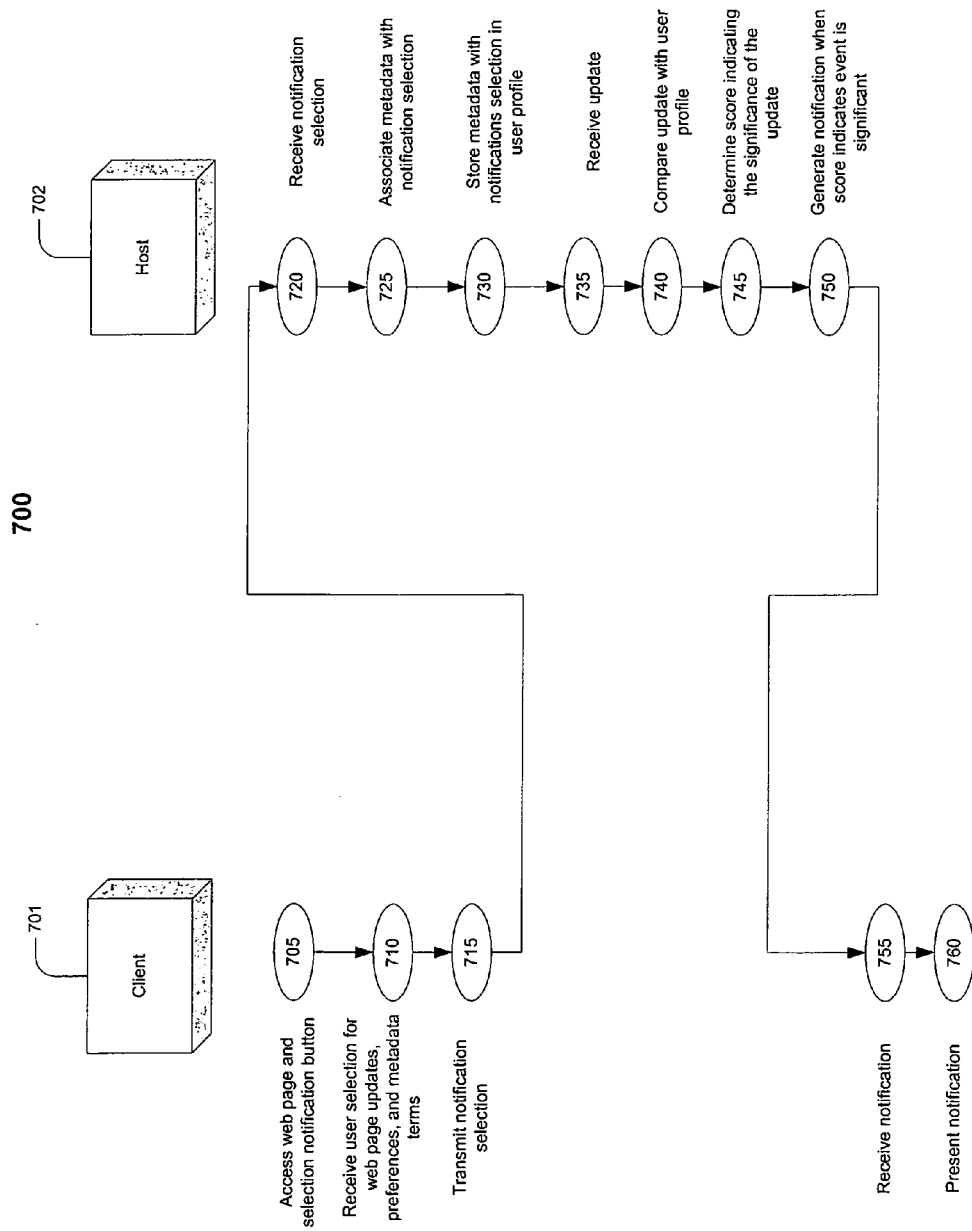
FIG. 7 is a flow chart of an exemplary process by which the client configures their preferences for notifications.

FIG. 7 is a flow chart 700 of an exemplary process by which the client 701 configures their preferences for notifications. For convenience, particular components and messaging formats described earlier are referenced as performing the process. However, similar methodologies may be applied in other implementations where different components are used to define the structure of the system, or where the functionality is distributed differently among the components shown.

Initially, a client 701 accesses a web page and selects a notification button (705). The client 701 receives the user selection for page updates, preferences, and metadata terms (710). The client 701 transmits the notification selection to the host 702 (715), which in turn, receives the notification and selection (720).

The host 702 associates metadata with the notification selection (725). For example, when a user has requested notification for events related to a presidential election, metadata terms relating to one or more candidates may be added. The notification selection and the metadata are then stored in a user profile (730).

The host 702 receives an update related to the notification selection (735). For example, an article relating to a metadata term (e.g., one of the candidates) may have been posted. Alternatively, the web site from which the notification was generated may have been updated. The host 702 compares the update with the user profile (740), and a predicted interest is determined for the update with respect to a user profile indicating the significance of the update (745). For example, when the updates match multiple terms appearing in the user profile, a predicted interest is determined that increases the likelihood of notification. Alternatively, when the user profile indicates that the user has limited their notification to one notification per day, the scoring process may be avoided and the notification to the particular user avoided. Similarly, when the user profile indicates that the user should only receive one notification per day unless the update is "hot", the predicted interest or threshold against which the update is compared may be adjusted so that only events of critical importance are transmitted. When the significance of the predicted interest supports notification, the host 702 generates a notification and transmits the notification to the client 701 (750). The client 701 receives the notification (755), and presents the notification (760).

FIG. 7A is a flow chart of an exemplary process by which the client may elect to receive notifications for subject matter in response to selecting a notification button. For convenience, particular components and messaging formats described earlier are referenced as performing the process. However, similar methodologies may be applied in other implementations where different components are used to define the structure of the system, or where the functionality is distributed differently among the components shown.

The client 701A accesses a web page and selection notification button. The host 702A receives the notification selection (710A), and retrieves preferences, metadata terms, and information descriptive of web pages updates (715A). For example, the host 702 may use an index of metadata that relates key terms to other terms of interest. The preferences may indicate a user preference in receiving updates. For example, the preference may indicate that the user is an avid college basketball fan but does not follow professional basketball. Accordingly, the preferences may be used to increase the likelihood of college basketball notifications while reducing the likelihood of professional basketball notifications. Retrieving the notifications may include relating the user preferences, metadata, and/or web page being accessed so that a list of subject matters that the user is presented to the user. For example, the web page from which the notification is generated may relate to a general news page (e.g., the top level page that is initially presented at cnn.com). The top-level page may be parsed to identify key terms. The key terms then may be related to a user profile and an index of metadata so that notifications related to the key terms, metadata, and the user profile receive an increased likelihood of being presented and/or selected in the notification enrollment process, and also generated when the notification is selected.

The user receives the preferences, metadata terms, and information descriptive of the web page updates (720A). Receiving the preferences, metadata terms, and information descriptive of the web page updates may include receiving a notification enrollment form similar to GUI 200, which is presented to the user. The client 701A then receives one or more user selections for the web page updates, preferences, and metadata terms (722A). The client 701A transmits the notification selections (725A). The host 702A stores the notifications selection so that notifications responsive to the notification selections may be generated (730A).

Other implementations are within the scope of the following claims. For example, the device configuring or requesting notification need not actually receive the notification. For example, a client may be used to select a notification that is transmitted to a wireless phone in critical circumstances.

Although the content source (e.g., a web server) and the host were described as separate systems, the content source and the host may share one or more components, code segments, processes, or structures. For example, a content provider may operate a web serving program and a notification program on the same server. The server may be configured to serve up web pages and also to provide notifications related to web page updates.

Other implementations may include a scoring system that generates a predicted interest responsive to a predictive interest by a user. For example, key terms appearing in a web page from which a user selected a notification button may be initially processed to find metadata that includes other terms related to the key terms. The key terms may be combined with the metadata and user preferences (e.g., frequency and priority of updates) to generate update criteria. The update criteria may be used in a scoring system that determines whether a notification is generated. For example, a host may monitor a web site for changes. When the web site changes, the host may identify which portions of the web site have changed (e.g., the different portion), and relate the update criteria to the different portion. When a key term appears with a greater frequency, a higher predicted interest may be generated. The higher predicted interest may indicate an increased likelihood of generating a notification. Alternatively, the absence or reduced frequency of the key term may lead to a lower likelihood of generating the notification. Terms appearing in the update criteria may relate to a different significance depending on which terms appear in the different portion. For example, if a candidate's name is considered crucial while a party affiliation is considered less relevant to a user's interest, the presence of the candidates name in the predicted interest may lead to a greater predicted interest/likelihood of generating the notification while the presence of the candidate's affiliation may lead to a lower predicted interest/likelihood.

A user may be allowed to specify terms in a notification that should not appear. For example, in configuring a notification, a user may be attempting to distinguish between a word with more than one meaning. Thus, a user that is a member of the Audubon society and interested in birds may request notifications for "falcons" and prairie falcons in particular while requesting that any updates for "falcons" that also refers to the National Football League (NFL) not be sent.

In one implementation, the notification system may be configured to translate the user preferences and interests into a filtering system administered on a web page or a host. The filtering system may include a scoring system and/or a Boolean programming system that relates the user's interests and preferences to proposed updates.

A host may proactively enroll a user in a notification system. For example, after determining that the user has allowed the host to provide notifications, a host may proactively monitor how a user is accessing the Internet and develop a user profile to provide notifications. The host then may monitor how the user responds to notifications and tailor the user profile and notifications in response.

What is claimed is:

1. A method comprising the following operations performed by one or more processors:
    receiving a notification instruction including a selection of an interest threshold from among a plurality of available interest thresholds, the notification instruction being associated with an online resource;
    identifying metadata associated with the notification instruction, wherein identifying metadata associated with the notification instruction comprises:
    parsing the online resource into a plurality of terms;
    automatically identifying key terms from among the plurality of terms appearing in the parsed online resource; and
    automatically identifying other terms related to the identified key terms;
    receiving selection of at least one of the identified other terms;
    generating update criteria related to the notification instruction and the at least one selected term;
    monitoring the online resource for updates;
    using the update criteria to determine a predicted interest of an update to the user;
    comparing the predicted interest to the selected interest threshold of the plurality of available interest thresholds; and
    in response to determining that the predicted interest satisfies the selected interest threshold, enabling delivery of a notification to the user.

2. The method of claim 1 wherein monitoring the online resource includes identifying web resources to be monitored based on at least the metadata.

3. The method of claim 1 wherein determining the predicted interest includes relating the update to the metadata.

4. The method of claim 1 wherein determining the predicted interest includes:
    relating an older instance of the online resource to a newer instance of the online resource to identify a change to the online resource,
    relating the update criteria to the different portion, and
    determining the predicted interest to indicate whether the different portion is responsive to the predicted interest.

5. The method of claim 1 wherein monitoring the online resource, determining the predicted interest, comparing the predicted interest, and enabling delivery of the notification includes monitoring multiple resources and determining if content from the online resource has been duplicated elsewhere in the multiple resources so that duplicate notifications are not generated.

6. The method of claim 1 wherein receiving the notification instruction, monitoring the online resource, generating the update criteria related to the notification instruction and the metadata, using the update criteria to determine the predicted interest, comparing the predicted interest, and enabling delivery of the notification includes:
    receiving the notification instruction requesting notification for critical events;
    monitoring a community of users to determine popular resources;
    determining whether the popular online resources relate to the update criteria; and
    enabling delivery of the notification for the popular resources related to the update criteria.

7. The method of claim 6 wherein determining whether the popular online resources relate includes identifying an online resource with a high rate of access.

8. The method of claim 6 wherein determining whether the popular online resources relate includes identifying an online resource experiencing a high degree of acceleration.

9. The method of claim 1 wherein using the update criteria to determine the predicted interest of the update includes determining whether enabling delivery of the notification violates a notification rule provided by the user.

10. The method of claim 9 wherein determining whether providing the notification for the update violates the notification rule provided by the user includes determining whether enabling delivery of the notification would violate a rule set with respect to the frequency with which the user requests an update.

11. The method of claim 10 further comprising determining whether the predicted significance indicates that a user preference for the frequency should be overridden, and if so, enabling delivery of the notification.

12. The method of claim 1 wherein receiving the notification instruction including the interest threshold includes receiving the notification instruction from a client selecting an option associated with the interest threshold in an information retrieval tool.

13. The method of claim 1 wherein receiving the notification instruction includes receiving the notification instruction from a host that is proactively enrolling the user in a notification system without the express request to enroll from the user.

14. The method of claim 1 wherein determining the predicted interest includes:
    monitoring a user's access technique for accessing a network, and
    determining the predicted interest responsive to the access technique.

15. The method of claim 14 wherein monitoring the user's access technique and determining the predicted interest responsive to the access technique includes:
    determining that the user may receive instant messages, and
    determining the predicted interest responsive to an instant message capability.

16. The method of claim 14 wherein monitoring the user's access technique and determining the predicted interest responsive to the access technique includes:
    determining that the user may receive electronic mail messages, and
    determining the predicted interest responsive to an electronic mail message capability.

17. The method of claim 14 wherein monitoring the user's access technique and determining the predicted interest responsive to the access technique includes:
    determining that the user may receive Short Message Service (SMS) or Multimedia Message Service (MMS) messages, and determining the predicted interest responsive to the SMS or the MMS message capability.

18. The method of claim 14 wherein monitoring the user's access technique and determining the predicted interest responsive to the access technique includes:
   determining that the user may receive voice communications, and
   determining the predicted interest responsive to the voice communications capability.

19. The method of claim 14 wherein monitoring the user's access technique and determining the predicted interest responsive to the access technique includes:
   determining a preference for receiving the notifications, and
   determining the predicted interest responsive to the preference when several forms of the access technique are available to use a preferred access technique.

20. The method of claim 1 wherein monitoring the online resource includes monitoring multiple web pages with a web domain.

21. The method of claim 20 wherein monitoring multiple web pages within the web domain includes monitoring multiple pages that are associated with a top-level domain name.

22. A system comprising one or more processors to implement the following:
   a communications interface structured and arranged to receive a notification instruction including a selection of an interest threshold from among a plurality of available interest thresholds, the notification instruction being associated with an online resource;
   a metadata code segment structured and arranged to identify metadata associated with the notification instruction by:
      parsing the online resource into a plurality of terms;
      automatically identifying key terms from among the plurality of terms appearing in the parsed online resource; and
      automatically identifying other terms related to the identified key terms;
   a term selection code segment structured and arranged to receive selection of at least one of the identified other terms;
   an update criteria code segment structured and arranged to generate update criteria related to the notification instruction and the at least one selected term;
   a monitoring code segment structured and arranged to monitor the online resource for updates;
   a scoring code segment structured and arranged to use the update criteria to determine a predicted interest in an update;
   a comparing code segment structured and arranged to compare the predicted interest to the selected interest threshold of the plurality of available interest thresholds; and
   a notification code segment structured and arranged to, in response to determining that the predicted interest satisfies the selected interest threshold, enable delivery of a notification to the user.

23. The system of claim 22 wherein the communications interface is structured and arranged to receive the notification instruction from a client selecting an option associated with the interest threshold in an information retrieval tool.

24. The system of claim 22 wherein the scoring code segment is structured and arranged to:
   determine a preference for receiving the notifications, and
   determine the predicted interest responsive to the preference when several forms of the access technique are available to use a preferred access technique.

25. The system of claim 22 wherein the monitoring code segment is structured and arranged to identify web resources to be monitored based on at least the metadata.

26. The system of claim 22 wherein the comparing code segment is structured and arranged to relate the update to the metadata.

27. A method comprising the following operations performed by at least one processor:
   enabling selection, by a user, of an interest indication among several available interest indications;
   receiving, from the user, a notification instruction including a selection of an interest indication from among the several available interest indications, the notification instruction being associated with an online resource;
   identifying metadata associated with the notification instruction, wherein identifying metadata associated with the notification instruction comprises:
      parsing the online resource into a plurality of terms;
      automatically identifying key terms from among the plurality of terms appearing in the parsed online resource; and
      automatically identifying other terms related to the identified key terms;
   receiving selection of at least one of the identified other terms;
   generating update criteria related to the notification instruction and the at least one selected term;
   monitoring the online resource for updates;
   using the update criteria to determine a predicted interest of an update to the user;
   relating the predicted interest to information corresponding to the selected interest indication from among the several available interest indications;
   determining, based on the relation of the predicted interest and the information corresponding to the selected interest indication from among the several available interest indications, that a notification associated with the update should be delivered;
   in response to determining that the notification associated with the update should be delivered, enabling delivery of a notification to the user.

28. The method of claim 27 wherein monitoring the online resource includes identifying web resources to be monitored based on at least the metadata.

29. The method of claim 27 wherein determining the predicted interest includes relating the update to the metadata.

30. The method of claim 27 wherein determining the predicted interest includes:
   relating an older instance of the online resource to a newer instance of the online resource to identify a change to the online resource,
   relating the update criteria to the different portion, and
   determining the predicted interest to indicate whether the different portion is responsive to the predicted interest.

31. The method of claim 27 wherein monitoring the online resource, determining the predicted interest, relating the predicted interest, and enabling delivery of the notification includes monitoring multiple resources and determining if content from the online resource has been duplicated elsewhere in the multiple resources so that duplicate notifications are not generated.

32. The method of claim 27 wherein receiving the notification instruction, monitoring the online resource, generating the update criteria related to the notification instruction and the metadata, using the update criteria to determine the predicted interest, relating the predicted interest, and enabling delivery of the notification includes:

receiving the notification instruction requesting notification for critical events;
monitoring a community of users to determine popular resources;
determining whether the popular online resources relate to the update criteria; and
enabling delivery of the notification for the popular resources related to the update criteria.

33. The method of claim 32 wherein determining whether the popular online resources relate includes identifying an online resource with a high rate of access.

34. The method of claim 32 wherein determining whether the popular online resources relate includes identifying an online resource experiencing a high degree of acceleration.

35. The method of claim 27 wherein using the update criteria to determine the predicted interest of the update includes determining whether enabling delivery of the notification violates a notification rule provided by the user.

36. The method of claim 35 wherein determining whether providing the notification for the update violates the notification rule provided by the user includes determining whether enabling delivery of the notification would violate a rule set with respect to the frequency with which the user requests an update.

37. The method of claim 36 further comprising determining whether the predicated significance indicates that a user preference for the frequency should be overridden, and if so, enabling delivery of the notification.

38. The method of claim 27 wherein receiving the notification instruction including the selection of an interest indication includes receiving the notification instruction from a client selecting an option associated with the interest indication in an information retrieval tool.

39. The method of claim 27 wherein receiving the notification instruction includes receiving the notification instruction from host that is proactively enrolling the user in a notification system without the express request to enroll from the user.

40. The method of claim 27 wherein determining the predicted interest includes:
monitoring a user's access technique for accessing a network, and
determining the predicted interest responsive to the access technique.

41. The method of claim 40 wherein monitoring the user's access technique and determining the predicted interest responsive to the access technique includes:
determining that the user may receive instant messages, and
determining the predicted interest responsive to an instant message capability.

42. The method of claim 40 wherein monitoring the user's access technique and determining the predicted interest responsive to the access technique includes:
determining that the user may receive electronic mail messages, and
determining the predicted interest responsive to an electronic mail message capability.

43. The method of claim 40 wherein monitoring the user's access technique and determining the predicted interest responsive to the access technique includes:
determining that the user may receive Short Message Service (SMS) or Multimedia Message Service (MMS) messages, and
determining the predicted interest responsive to the SMS or the MMS message capability.

44. The method of claim 40 wherein monitoring the user's access technique and determining the predicted interest responsive to the access technique includes:
determining that the user may receive voice communications, and
determining the predicted interest responsive to the voice communications capability.

45. The method of claim 40 wherein monitoring the user's access technique and determining the predicted interest responsive to the access technique includes:
determining a preference for receiving the notifications, and
determining the predicted interest responsive to the preference when several forms of the access technique are available to use a preferred access technique.

46. The method of claim 27 wherein monitoring the online resource includes monitoring multiple web pages within a web domain.

47. The method of claim 46 wherein monitoring multiple web pages within the web domain includes monitoring multiple web pages within the web domain includes multiple pages that are associated with a top-level domain name.

48. The method of claim 27 wherein relating the predicted interest to information corresponding to the selected interest indication includes relating the predicted interest to the selected interest indication.

49. The method of claim 27 wherein relating the predicted interest to information corresponding to the selected interest indication includes relating the predicted interest to a threshold set with respect to the selected interest indication.

* * * * *